United States Patent [19]

Umetsu et al.

[11] Patent Number: 5,032,701
[45] Date of Patent: Jul. 16, 1991

[54] WIRE CUTTING ELECTRIC DISCHARGE MACHINE WITH TWISTED CONVEYOR BELTS

[75] Inventors: Masahito Umetsu; Morikatsu Matsuda, both of Kanagawa, Japan

[73] Assignees: Amada Company, Limited; Amada Wasino Co., Ltd., both of Japan

[21] Appl. No.: 425,199

[22] PCT Filed: Feb. 10, 1989

[86] PCT No.: PCT/JP89/00137
§ 371 Date: Nov. 27, 1989
§ 102(e) Date: Nov. 27, 1989

[87] PCT Pub. No.: WO89/07506
PCT Pub. Date: Aug. 24, 1989

[30] Foreign Application Priority Data

Feb. 10, 1988 [JP] Japan .................. 63-29094

[51] Int. Cl.⁵ .................. B23H 7/10
[52] U.S. Cl. .................. 219/69.12
[58] Field of Search .................. 219/69.12; 226/172

[56] References Cited

U.S. PATENT DOCUMENTS 3,368,728 2/1968 Gudmestad .................. 226/172

FOREIGN PATENT DOCUMENTS 57-27624 2/1982 Japan .
57-149124 9/1982 Japan .
62-44319 2/1987 Japan .
641991 3/1984 Switzerland .................. 219/69.12

Primary Examiner—Geoffrey S. Evans
Attorney, Agent, or Firm—Wigman & Cohen, P.C.

[57] ABSTRACT

A wire cutting electric discharge machine, in which a wire 27 which has been used a is interposedly supported between opposed top and bottom endless belts 35 and discharged from the machine. The force between the belts 35 with which the wire is interposedly supported can be increased, and the wire 27 can be discharged irrespective of any wear on the belts 35. In addition, in order to extend the life of the belts, during the interval in which the wire is being interposedly supported by the belts, a twist is imparted to the belts and a pair of wire discharge rollers which stretches the wire provided at the rear side of the belts.

6 Claims, 2 Drawing Sheets

WIRE CUTTING ELECTRIC DISCHARGE MACHINE WITH TWISTED CONVEYOR BELTS

BACKGROUND OF THE INVENTION

1. Field of the Invention

The present invention relates to a wire discharge device for a wire cutting electric discharge machine, and, in particular, to a wire discharge device in which vibration in the wire is suppressed while the wire which has been used in the electric discharge process is being discharged, so that no wear occurs in conveyor belts and the discharge can be performed smoothly.

2. Description of the Prior Art

Conventionally, as a recovery means for recovering a wire used in an electric discharge process in a wire cutting electric discharge machine, a device in which the wire is interposedly supported between opposed top and bottom endless flat conveyor belts is used, and the belts are driven so that the wire is stretched and discharged to the outside of the machine.

In such a conventional wire electric discharge device of the type outlined above, since the part which interposedly supports the wire is limited to one position on the conveyor belts, the belts become worn from contact with the wire and a groove is formed therein, so that slip is produced between the wire and the belts and forced stretching is not possible. This problem results that the life of the belt is shortened, and when the wire is fed in, vibration occurs because of the wear in the belts.

Furthermore, since there is no control of the position of the wire which is interposedly supported in a conveying interval between the wire insertion section of the conveyor belt and the discharge end of the wire, the wire does not run in a straight line so that bending and distortion are produced in the wire being discharged. This leads to the inconvenience that the amount of wire which can be accommodated in the recovery box for recovering the wire outside the machine is reduced.

In view of the above drawbacks, this invention has been made. Therefore, an object of the present invention is to provide a wire discharge device for a wire cutting electric discharge machine which comprises a conveyor belt mechanism with a feed roller and discharge rollers provided in the front and rear sides of the member, respectively, and a twist added to belts stretched between the conveying interval, of the conveyor belt mechanism wherein the wire can be conveyed in a straight line and wear in the belts does not give any affect to the discharge of the wire, whereby the replacement cycle of the belts can be extended.

According to the present invention, a wire discharge device for use in a wire cutting electric discharge machine comprises a feed roller which drives a wire used as the wire electrode, a belt conveyor mechanism which conveys the wire having been drive, and a pair of discharge rollers which pinches and feeds the wire to a recovery box. The conveyor mechanism has an upper belt conveyor and a lower belt conveyor disposed underneath the upper belt conveyor so that the wire is interposed between two belts, with the two belts twisted and in contact with each other over an interval. The wire used in the wire cutting electric discharge machine is thus conveyed to a recovery box through the conveyor mechanism by driving the feed roller and the pair of discharge rollers. Since the belts are twisted together, the wire interposed between the belts is conveyed in a straight line extended through the twisted conveying interval.

In the present invention having the structure as described above, the feeding, stretching and discharge actions of the wire can be smoothly carried out by driving the feed roller and the discharge rollers provided at the front and rear sides of the conveyor belt mechanism. Further, since the twist is added to the conveyor belts in the conveying interval of the conveyor belt mechanism, the force interposedly supporting the wire is increased so that the wire is aligned and can be made to run in a straight line.

BEST MODE FOR CARRYING OUT THE INVENTION

Figure 2:
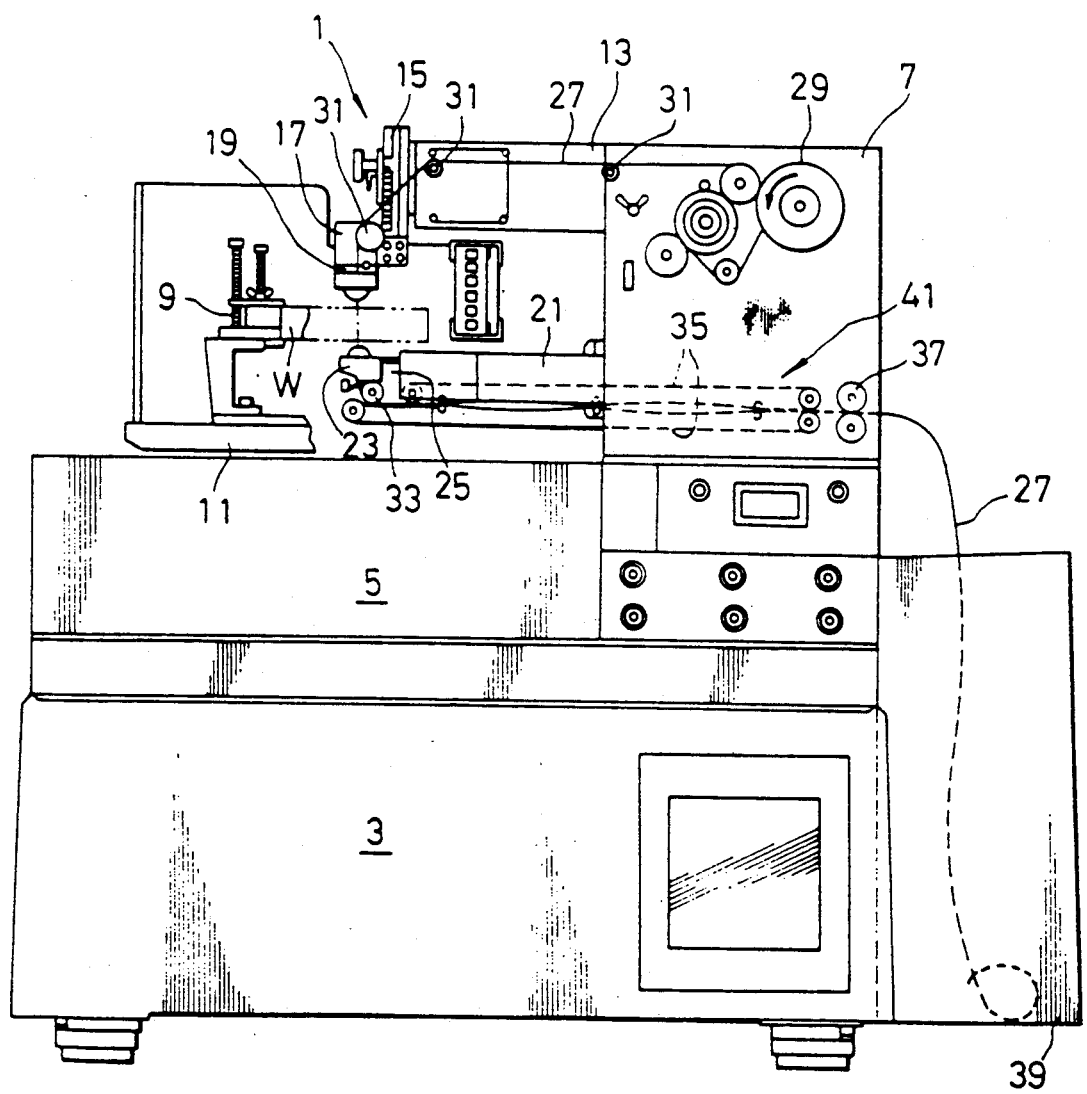
FIG. 2 is an explanatory drawing showing the whole structure of a wire cutting electric discharge machine.

Now referring to FIG. 2, this drawing shows an example in general outline of the whole structure of a wire cutting electric discharge machine.

The wire cutting electric discharge machine 1 comprises a process liquid receiver 5 on a base 3 and a column 7. On the upper side of the process liquid receiver 5, a movable table 11 provided with a workpiece clamp 9 for supportingly securing a workpiece W is supported in a manner to allow two dimensional movement in both the X and Y directions.

On the upper side surface of the column 7, an upper arm 13 is mounted. On the tip of this upper arm 13, a vertically movable slide 15 is provided in a freely vertically positional adjustable manner. On the lower tip of the slide 15, an upper nozzle holder 17 is installed. An upper process liquid supply nozzle 19 is mounted on the upper nozzle holder 17.

In addition, on the side surface close to the lower section of the column 7, a lower arm 21 is installed parallel to the upper arm 13. On the tip portion of the lower arm 21, there is provided through a lower nozzle supply nozzle 23 a lower process liquid supply nozzle 23 which is opposing the upper process liquid supply nozzle 19. The upper process liquid supply nozzle 19 and the lower process liquid supply nozzle 23 spray a process liquid such as distilled water onto the electric discharge process area of the workpiece W, which are also used to guide a wire 27 used as an electrode to maintain its direction.

On the upper section of the column 7, a supply reel 29 which continuously supplies the very fine wire 27 to the electric discharge area is mounted in a freely rotatable manner.

The wire 27 from the supply reel 29 reaches the upper process liquid supply nozzle 19 via a plurality of freely rotatable upper guide rollers 31 which are provided ranging from the column 7 to the upper nozzle holder 17, and the wire 27 runs from the upper process liquid supply nozzle 19, through the electric discharge area of the workpiece W, to reach the lower process liquid supply nozzle 23.

In addition, the wire 27 is discharged to a recovery box 39 provided on the side of the base 3 by means of a wire discharge device 41. The wire discharge device 41 comprises a very hard feed roller 33, for example made of ceramic, for winding up the wire, which is provided on the lower nozzle holder 25; a pair of conveyor belts 35 which interposedly support and convey the wire 27; and a pair of wire discharge rollers 37 of the same quality as the feed roller 33, which is provided at the rear of the conveyor belts 35.

The wire discharge device 41 shown in FIG. 2 will now be explained in detail.

Figure 1:
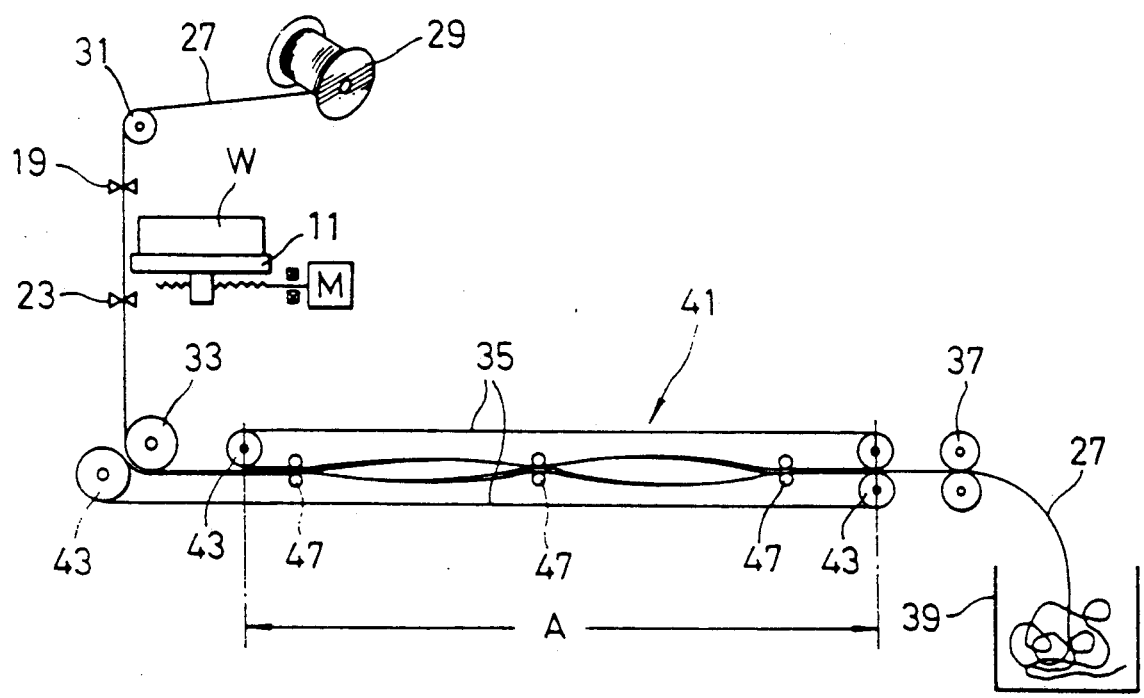
FIG. 1 is an explanatory drawing showing an embodiment of the device according to the present invention.

Now referring to FIG. 1, the wire 27 fed out from the supply reel 29, is guided to the upper process liquid supply nozzle 19 by means of the upper guide rollers 31, and reaches the lower process liquid supply nozzle 23.

The workpiece W placed on the work table 11 which is movably by means of a drive system which is driven by a motor through a screw member or the like is processed by the wire 27 which is stretched between the upper process liquid supply nozzle 19 and the lower process liquid supply nozzle 23.

The wire 27 used in the electric discharge process is guided by means of the feed roller 33 used for winding up the wire. The feed roller 33 is made of a very hard material, for example, from a ceramic or the like, and is provided on the lower nozzle holder 25. The wire 27 is fed to a conveyor belt mechanism having an upper belt conveyor 35 and a lower belt conveyor 35. Both the belt conveyor 35 are laid horizontally with an upper side belt portion of the lower belt conveyor 35 and a lower side belt portion of the upper belt conveyor 35 are in close contact with each other, by means of, at least, a pair of guide rollers 47. The pair of guide rollers 47 is so provided that both conveyor belt portions contacting each other are twisted together, over an interval, about their longitudinal axes through an angle of 180 degrees as illustrated in FIG. 1.

The wire 27 conveyed horizontally through the twisted belts is stored in the recovery box 39 by means of a pair of wire discharge rollers 37 which pinches the wire at the discharge end of the conveying mechanism. The feed roller 33 and one of the discharge rollers 37 are suitably driven by a drive system not shown. In this configuration, the wire is conveyed through a spiral space formed between the two belts so that the wire is guided always to the center of the spiral.

Consequently, over the conveying portion A where the belts are twisted, the wire is held straight and protected from vibrations which may be caused in the electric discharge process.

In addition, since the feed roller 33 contacts with the lower belt conveyor, the conveyor mechanism is driven at a speed equivalent to the conveying speed of the wire so that the wire does not slip on either of the belts, and wear of the belts is saved in an effective manner.

Furthermore, if the feed roller and the pair of discharge rollers are made of hard material, such as superalloy or ceramic, wear of these is reduced considerably.

As explained above, because the wire 27 can be conveyed without any vibration and wear in the conveyor belts 35 does not give any affect to the discharge of the wire 27, the replacement cycle of the conveyor belts 35 can be extended.

The present invention is not limited to the embodiment described above. Suitable changes may be made within the scope of the claims.

INDUSTRIAL APPLICABILITY

As is clearly shown in the above explanation of the embodiment, the wire discharge device for a wire cutting electric discharge machine of the present invention is provided with a belt conveyor mechanism having an upper and a lower conveyor belt by which the wire is conveyed in an interposedly supported manner therebetween and a feed roll and discharge rolls both made of a very hard material which are provided at the front and rear sides the belt conveyor mechanism, and the at least one twist is imparted to the belts within the conveying interval of the conveyor belts, so that the wire can be smoothly discharged with no relation to any wear caused in the belts, and as a result the replacement cycle of the belts can be extended. Therefore, the wire discharge device is useful in a wire cutting electric discharge machine.

What is claimed is:

1. A wire discharge device for use in a wire cutting electric discharge machine for recovering a wire which has been used in a discharge process, which comprises:
   a conveyor belt mechanism having an upper and a lower belt between which the wire is interposedly supported to be conveyed, the conveyor belt mechanism having a conveying interval therein;
   a feed roller made of a very hard material provided at the front side of the conveyor belt mechanism; and
   a pair of discharge rollers made of a very hard material provided at the rear side of the conveyor belt mechanism; and
   at least one twist imparted to the belts in the conveying interval of the conveyor belt mechanism.

2. The wire discharge device for a wire cutting electric discharge machine of claim 1, wherein the wire is discharged by using stretching action made by the discharge rollers.

3. The wire discharge device for a wire cutting electric discharge machine of claim 1, wherein the feed roller and the discharge rollers are made of ceramic.

4. A wire discharge device for use in a wire cutting electric discharge machine for recovering a wire which has been used as the electrode, which comprises:
   a conveyor belt mechanism having an upper belt conveyor and a lower belt conveyor that lies underneath said upper belt conveyor, said conveyor belts contacting each other in a contact interval to convey a wire interposed therebetween, said belts twisted together for at least one twist over a portion of said contact interval,
   and a pair of guide roller for maintaining said twist in the conveyor belts in said contact interval.

5. The wire discharge device for use in a wire cutting electric discharge machine of claim 4, wherein said conveyor belt mechanism has a front end and a read end and wherein further the wire discharge device further comprises:
   a feed roller made of very hard material provided at the front end of the conveyor belt mechanism; and
   a pair of discharge rollers made of very hard material provided at the rear end of the conveyor belt mechanism.

6. The wire discharge device for use in a wire cutting electric discharge machine of claim 5, wherein the feed roller and the discharge rollers are made of ceramic.

* * * * *